April 16, 1968 W. L. FERRIGNO, JR 3,378,777
MOTOR CONTROL CIRCUIT WITH PHASING MEANS FOR PREVENTING
ERRATIC MOTOR OPERATION
Filed Jan. 30, 1964 2 Sheets-Sheet 2
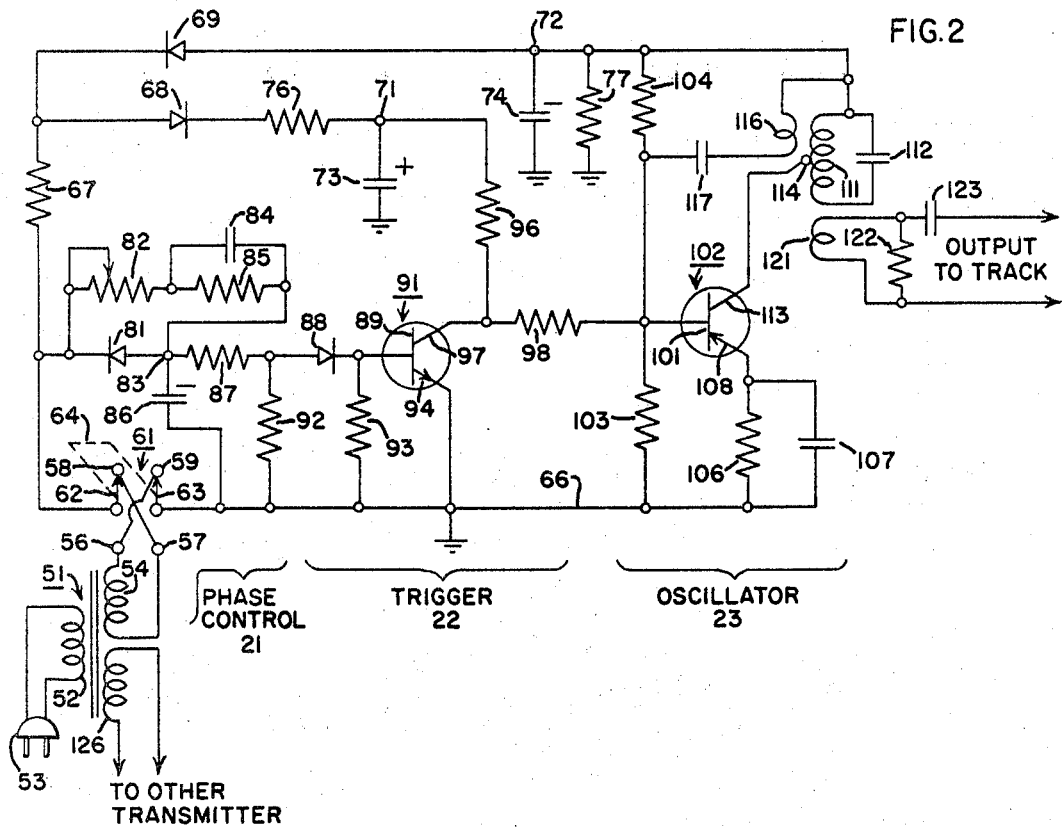
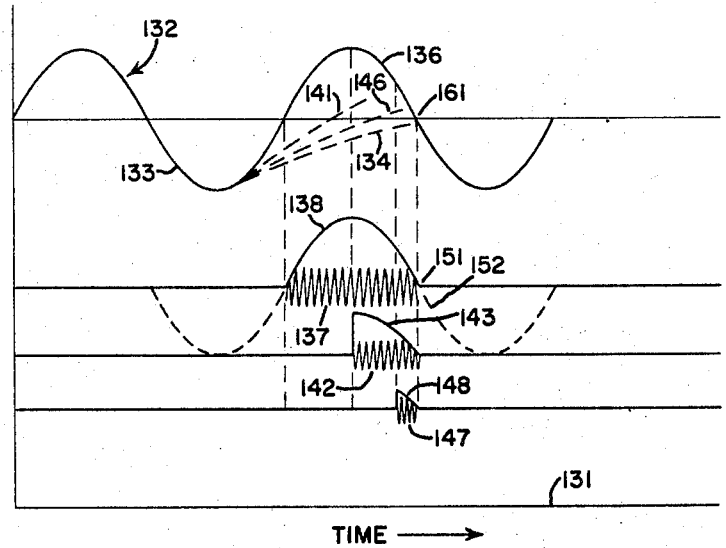
INVENTOR:
WILLIAM L. FERRIGNO, Jr.
BY Norman C. Fulmer
HIS ATTORNEY.

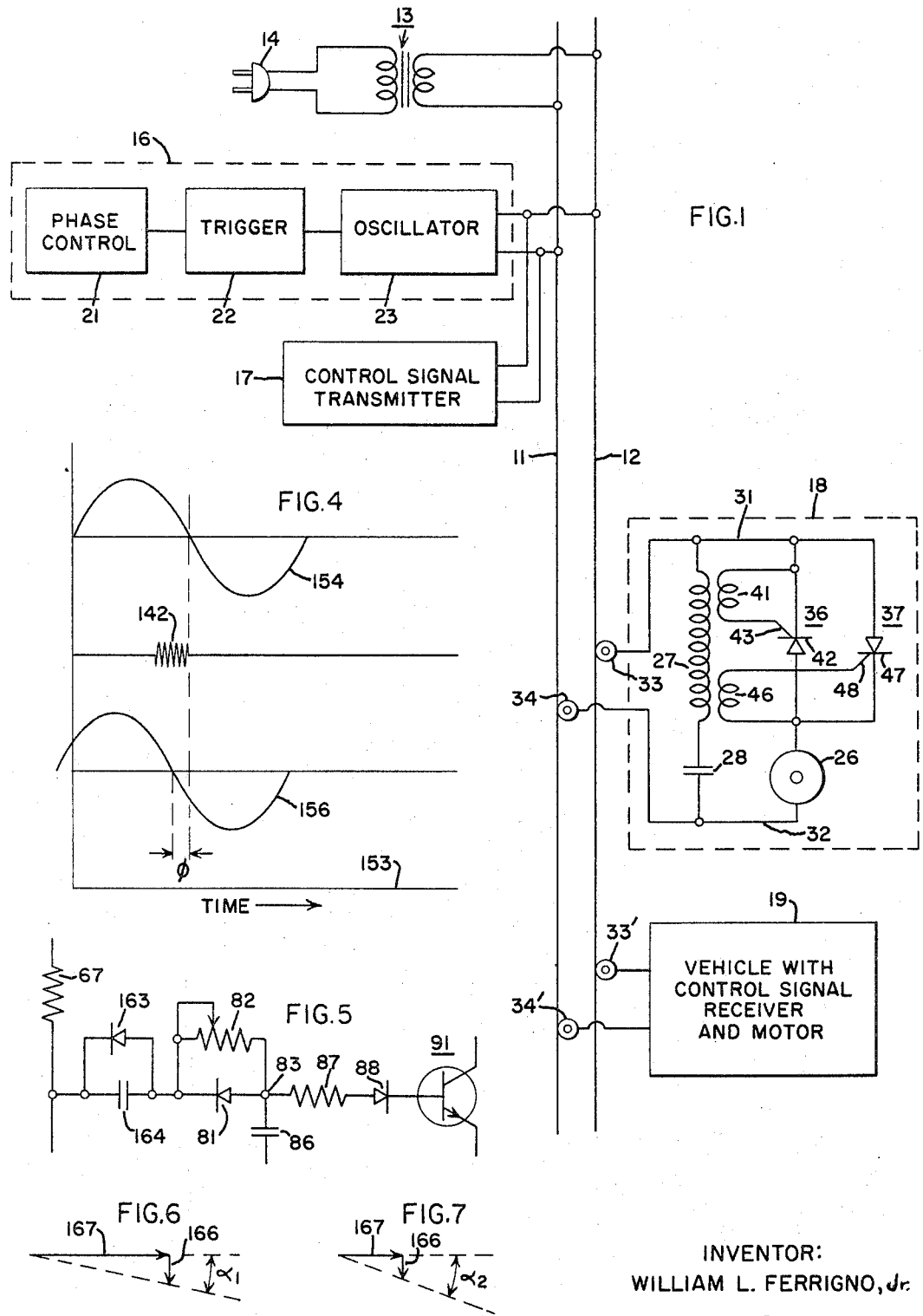

United States Patent Office 3,378,777
Patented Apr. 16, 1968

3,378,777
MOTOR CONTROL CIRCUIT WITH PHASING MEANS FOR PREVENTING ERRATIC MOTOR OPERATION
William L. Ferrigno, Jr., Barneveld, N.Y., assignor to General Electric Company, a corporation of New York
Filed Jan. 30, 1964, Ser. No. 341,367
3 Claims. (Cl. 328—155)

ABSTRACT OF THE DISCLOSURE

A motor control circuit including a trigger circuit for triggering a control pulse oscillator, the trigger circuit including phasing means for preventing erratic motor operation.

This invention relates to transmitters for producing control signals, and particularly relates to transmitters for producing repetitive bursts or pulses of alternating voltage, these pulses being synchronized with respect to an alternating power current which is used for supplying electrical power to motors of model trains or cars or other vehicles, or other electrical devices.

Patent application Ser. No. 340,673, filed Jan. 28, 1964, now Patent 3,355,643, and assigned to the same assignee as the present invention, describes a remote control system for controlling several model trains, cars, and the like, on the same track or electrical power system, in which the motors or other electrical devices are controlled in speed and direction by means of variably phased pulses of alternating voltage. Patent application Ser. No. 341,366, filed Jan. 30, 1964, and assigned to the same assignee as the present invention, describes and claims an improved pulse transmitter circuit for such a system. The present invention will be particularly described as embodied in the transmitter circuit of the latter patent application.

An object of the present invention is to provide an improved transmitter circuit for producing synchronized pulses of alternating voltage for controlling D-C motors and the like.

Another object is to provide a reliable low-cost transmitter circuit for producing synchronized pulses of alternating voltage for controlling D-C motors and the like, in which means is provided for preventing reverse D-C current from flowing in the motor.

Other objects will be apparent from the following description and claims, and from the accompanying drawing.

The transmitter of the invention comprises, basically and in its preferred embodiment, a circuit for producing an alternating voltage pulse at a chosen time during each alternate half-cycle of an alternating power and circuit means for causing the pulse to terminate earlier as the chosen time of occurrence of the pulse becomes earlier during the alternate half-cycle of current.

FIG. 1 of the drawing is an electrical diagram of a remote control vehicle system embodying the transmitter of the invention;

FIG. 2 is an electrical schematic diagram of a preferred embodiment of the transmitter of the invention;

FIG. 3 is a plot of signals for explaining the functioning of the transmitter;

FIG. 4 is a plot of signals for explaining the functioning of the invention;

FIG. 5 is a schematic diagram of an alternative embodiment of the invention; and FIGS. 6 and 7 are vector diagrams for explaining the functioning of the invention.

The general arrangement of the control system will first be described, and then the improved transmitter circuit of the invention will be described in detail.

In FIG. 1, tracks 11 and 12, or electrical conductors, of a train or other vehicle system have alternating power current, of 60 cycle for example, applied thereto by means of a transformer 13 adapted for connection to household power by means of a plug 14. A first transmitter 16 and a second transmitter 17, each of which may utilize the invention and which respectively provide control pulses of different frequency alternating voltages, are connected to the tracks 11 and 12. First and second trains or other vehicles 18, 19, each having a motor and a receiver circuit for controlling the motor, are connected to the tracks 11 and 12.

The transmitter 16 comprises a phase control circuit 21, a trigger circuit 22, and an oscillator circuit 23, and will be described in detail with reference to FIG. 2. The other transmitter 17 is similar to the transmitter 16, but the oscillator thereof oscillates at a different frequency than that of transmitter 16 so as to control a different receiver circuit. For example, the oscillator 23 of transmitter 16 oscillates at a selected frequency (such as 100 kilocycles per second) so as to actuate only the receiver circuit in vehicle 18, and the oscillator of transmitter 17 oscillates at a different frequency (such as 255 kilocycles per second) so as to actuate only the receiver circuit in vehicle 19.

The vehicle 18 includes a D-C motor 26 for driving the vehicle, and the receiver circuit comprises an inductor 27 and capacitor 28 connected in series across conductors 31 and 32 which are respectively connected to the tracks 11 and 12 by means of vehicle wheels 33, 34, or by sliding brushes or other suitable means. The inductor 27 and capacitor 28 are series resonant at the 100 kc. frequency of the oscillator 23. A pair of silicon controlled rectifiers 36 and 37 (commonly called SCR's) are connected in parallel with unlike current-carrying electrodes connected together, in so-called back-to-back relationship, between the conductor 31 and the motor 26, the other motor terminal being connected to the conductor 32. A first secondary winding 41 is inductively coupled to inductor 27 and is connected between the cathode 42 and control electrode 43 of the SCR 36. Similarly, a second secondary winding 46 is inductively coupled to inductor 27, and is connected between the cathode 47 and control electrode 48 of the SCR 37.

The control pulses of 100 kc. bursts produced by the transmitter 16 are selectively received by the resonant circuit of the inductor 27 and capacitor 28, and are coupled by the secondary windings 41 and 46 to the control electrodes of both SCR's 36 and 37. If these control pulses occur at times when the 60 cycle alternating current is positive at the conductor 31, with respect to conductor 32, the SCR 37 will be rendered conductive upon commencement of each of the pulses and will apply current in a "positive" direction through the motor 26 for a portion of each positive half-cycle, thereby causing the motor 26 to rotate in one direction, for example the "forward" direction. Since the SCR, upon being rendered conductive, remains conductive until the current therethrough finishes its half-cycle duration, it is not important as to how long each control pulse lasts. By varying the phase of the control pulses with respect to the power current, the speed of the motor can be varied at will. If the control pulses occur at times when the power current is negative at conductor 31, the other SCR 36 will be rendered conductive and apply current in a "negative" direction through the motor 26 for a portion of each negative half-cycle, thereby causing it to rotate in the other or "reverse" direction, for reversal of the vehicle 18.

Similarly, the alternating-voltage control signal produced by the transmitter 17 is selectively utilized by the receiver of vehicle 19 to control the motor thereof. Vehicles 18 and 19 may contain identical circuitry except that their resonant filters are tuned to different frequencies corresponding to the different frequencies of the control voltage signals produced by the transmitters 16 and 17. Any desired number of transmitters and receivers may thus be employed.

The control system in general and its circuitry are more fully described, and are claimed, in the aforementioned copending patent application.

From the foregoing, the purpose of the control signal transmitters will be apparent. The transmitter will now be described in detail, with reference to FIGS. 2 and 3.

A power supply transformer 51 has a primary winding 52 connected to a power plug 53 for insertion into an A-C household outlet, and a secondary winding 54 having the ends thereof cross-connected to a first pair of switch contacts 56, 57, and a second pair of contacts 58, 59, of a phase reversal switch 61 which has two contact arms 62, 63 which are mechanically linked together as indicated at 64 to make contact with contacts 56 and 57 or with contacts 58 and 59. Switch arm 63 is connected to an electrical "ground" conductor 66. Switch arm 62 is connected, via a filter resistor 67, to two rectifiers 68 and 69. Rectifier 68 is connected to provide a positive-polarity direct voltage at point 71, and rectifier 69 is connected to provide a negative-polarity direct voltage at point 72. Filter capacitors 73 and 74 are connected between electrical ground and the voltage points 71 and 72, respectively. A voltage-dropping resistor 76 is interposed in the path of rectifier 68, and a "bleeder" resistor 77 is connected across the capacitor 74.

A diode 81 is connected between the switch arm 62 and a point 83, and a filter capacitor 86 is connected between point 83 and electrical ground. A variable resistor 82, and a parallel combination of a capacitor 84 and a resistor 85, are connected in series across the diode 81. The capacitor 84 and resistor 85 comprise a circuit for automatically shifting the timing of termination of the control pulses produced by the transmitter, in accordance with the invention, as will be described. A resistor 87 and a diode 88 are connected in series between point 83 and the base electrode 89 of a trigger transistor 91. Resistors 92 and 93 are connected between electrical ground and the electrodes of diode 88, respectively. The diode 81 is poled so as to conduct negative current toward the base electrode 89, whereas the diode 88 is oppositely poled.

The emitter electrode 94 of the trigger transistor 91 is grounded, and a load resistor 96 is connected between the collector electrode 97 and the positive voltage point 71.

A current-limiting and isolation resistor 98 is connected between the collector electrode 97 and the base electrode 101 of an oscillator transistor 102. Resistors 103 and 104, for providing base bias, are connected between the base electrode 101, and electrical ground and point 72 of negative voltage, respectively. A biasing resistor 106 and capacitor 107 are connected in parallel between the emitter electrode 108 and electrical ground.

An oscillator coil 111 is connected in parallel with a capacitor 112, and an end thereof is connected to the point 72 of negative voltage. The collector electrode 113 of oscillator transistor 102 is connected to a tap 114 on the oscillator coil 111. A "tickler" feedback coil 116 is inductively coupled to the oscillator coil 111, and an end thereof is connected to the point 72 of negative voltage. A feedback capacitor 117 is connected between the other end of the feed-back coil 116 and the base electrode 101. When this oscillator 23 oscillates, its frequency (100 kc., for example) is determined by the resonant frequency of coil 111 and capacitor 112. An output winding 121 is inductively coupled to the oscillator coil 111. A resistor 122 connected across the output winding 121 is for maintaining a more constant loading on the oscillator, and a capacitor 123 couples A-C control signals from the oscillator 23 to the tracks 11 and 12 and also prevents the output winding 121 from providing a D-C and low-frequency A-C short circuit across the tracks.

When one or more other transmitters are employed, certain portions of the just-described transmitter circuit can be used in common with all of the transmitters. For example, a single power supply will suffice, with one or more additional windings 126 provided on the transformer 51 to provide A-C for one or more additional transmitters. The positive and negative voltage points 71 and 72 may be utilized by other transmitters, so that additional rectifiers 68 and 69, and associated circuitry, are not required. Additional transmitter output windings may be connected in series with the output winding 121.

The transmitter circuit of FIG. 2 functions as follows, with reference to FIG. 3, in which the horizontal axis 131 represents time. Normally, neither of the transistors 91 and 102 draws any appreciable current, and hence the oscillator 23 does not oscillate. The sine wave 132 represents the phase of the current at switch arm 62, which current is applied to the cathode of diode 81. The diode 81 conducts during the negative half-cycles 133 and charges the capacitor 86 negatively. This negative charge leaks off through the variable resistor 82, and also partly through resistors 87 and 92. When the variable resistor 82 is set at its maximum resistance value, the capacitor 86 discharges along the path 134 of FIG. 3 and hence the point 83 does not become slightly positive as is required to bias the base electrode 89 of the trigger transistor to cause this trigger transistor 91 to become conductive. In this condition, the motor 26 in the associated vehilce will be stopped.

If the variable resistor 82 is set for minimum resistance, it shorts out diode 81, and the positive half-cycles 136 of the alternating current 132 will flow to the base electrode 89 and cause the trigger transistor 91 to be conductive during the full period of every positive half-cycle. When the trigger transistor 91 is conductive, its collector electrode 97 assumes a potential near electrical ground, which biases the oscillator transistor 102 "on" so that it oscillates, at a frequency determined by the coil 111 and capacitor 112, until the trigger transistor goes "off" at the end of the positive half-cycle 136. Numeral 137 indicates the oscillator output signal, and numeral 138 indicates the resulting half-cycle of current which will flow through the motor 26 in a vehicle 18. The diode 88 functions to prevent the negative half-cycles 133 from reaching the base electrode 89, as these negative half-cycles could injure the trigger transistor 91.

If the variable resistor 82 is adjusted to an intermediate value of resistance, such as by means of a "vehicle speed" control knob, the discharge of negative voltage on capacitor 86 which occurs every cycle of the current 132 will be as indicated by numeral 141, and renders the base electrode 89 slightly positive at a time half-way through the positive half-cycle 136, whereby the trigger transistor 91 conducts and turns on the oscillator 102 to produce an output signal indicated at 142, whereby the motor current 143 is at a half-speed value.

If the variable resistor 82 is adjusted for greater (but not maximum) resistance, the discharge of capacitor 86 will be as indicated at 146, and renders the trigger transistor 91 conductive at a time near the end of the positive half-cycle 136, which causes the oscillator 23 to produce an output control signal as indicated at 147. The resulting small current 148 through the vehicle motor causes slow-speed operation of the vehicle.

The motor currents 138, 143, and 148 will be of given polarity and the motor will rotate in a given direction. Reversal of the phase of the control circuit current 132 by means of reversal switch 61, will shift the phase of the control pulses 137, 142, and 147 by 180 degrees, and hence the motor currents 138, 143, and 148 will be reversed in polarity and the motor will rotate in the opposite direction.

It has been found that the above-described system, when the parallel connected capacitor 84 and resistor 85 were not interposed in series with the variable resistor 82 in accordance with the invention, tended to cause rough and jerky movement of the vehicles 18 and 19, especially when operated at high speeds. An obvious theory for this effect, is that high-speed operation of the motors 26 may somehow cause noise pulses which cause erratic misfiring of the SCR's 36 and 37. However, noise was found not to be the cause, and it was then discovered that, at high speed operation of the motors 26, these motors generate a sufficient counter-voltage at the time of current cut-off at the end of a half-cycle 138 of current, indicated by numeral 151 in FIG. 3, which, combined with a phase shift of motor voltage due to inductance of the motor, would cause the control pulse 137 to "fire" the other SCR for a beginning portion of the next half-cycle 152 of power current.

FIG. 4, in which the horizontal axis 153 represents time, illustrates the phase shift of motor voltage caused by the motor inductance. Curve 154 represents an alternating voltage applied to the tracks, which is in phase (either direct phase or reverse phase) with the alternating current 132 (FIG. 3) of the transmitter control circuit. The inductance of the motor 26 shifts the motor voltage ahead in time, as shown by the curve 156. Therefore, a control pulse, for example the control pulse 142, which terminates when the voltage 154 passes through zero, exists a short time after the motor voltage 156 passes through zero, causing the wrong SCR, for example the SCR 36, to be rendered conductive during a short time $\phi$ after the controlling SCR, for example the SCR 37, turns off. This causes reverse-current pulses to flow through the motor, causing jerky operation and tending to damage the motor. The undesired effect is augmented by counter-voltage generated by the motor inductance, which biases the "wrong" SCR for easier firing. This counter-voltage becomes greater, and hence the undesired firing of the "wrong" SCR becomes greater, as the motor speed is increased.

A fixed time shift, or shortening of time duration of the control pulses, would cure the difficulty at high-speed operation of the motor, but would prevent satisfactory operation of the motor at slow speeds when the slow-speed pulse 137 (FIG. 3) must be close to the end of the power current half-cycle under conditions when the counter-voltage of the motor is small.

In accordance with the invention, the transmitter is provided with a circuit for causing the control pulses to terminate earlier as the speed of the motor is increased. The parallel-connected capacitor 84 and resistor 85, in FIG. 2, achieves this result as follows. At slow-speed motor operation, the resistance 82 is set at a large value of resistance, and capacitor 84 has relatively small effect on the phase of the control current 132. As the resistance of resistor 82 is decreased, for higher speed motor operation, the current through the capacitor 84 increases and the phase of this current advances, i.e. occurs sooner, causing the control current 132 to pass through the zero point 161 (FIG. 3) earlier, thus turning off the trigger transistor 91 earlier and terminating the control pulse 137 earlier, thus achieving the objective of the invention.

In the alternative embodiment of FIG. 5, the capacitor 84 and resistor 85 of FIG. 2 are eliminated, and a diode 163 and capacitor 164 are connected in parallel and interposed in series with the parallel combination of the diode 81 and variable resistor 82, as shown. The diode 163 permits the negative half-cycles 133 of control current 132 (FIG. 3) to flow to the point 83 unaffected in phase. The capacitor 164 causes the positive half-cycles 136 of control current 132 to shift in phase to a slightly earlier time when the resistor 82 is at high values of resistance, so that the cross-through-zero current point 161, at which trigger transistor 91 cuts off, occurs slightly earlier. As the resistor 82 is decreased in resistance value for faster motor operation, the capacitor 164 causes the positive half-cycles 136 to shift to an earlier occurrence. FIGS. 6 and 7 illustrate this effect. In FIGS. 6 and 7, the vectors 166 represent the impedance of the capacitor 164, and the vectors 167 represent the impedance of variable resistance 82. For low speed operation, the resistance 82 is relatively large and the vector 167 is relatively long, as shown in FIG. 6, resulting in a small phase shift $\alpha_1$. For high speed operation, the resistance 82 is relatively small and the vector 167 is relatively short, as shown in FIG. 7 resulting in a larger phase shift $\alpha_2$ and hence an advancement in time of the control current half-cycle 136.

In both embodiments of the invention, the negative half-cycles 133 of control current are unaffected in phase, and hence the timing of commencement of the cyclic discharging of capacitor 86 is not affected.

While preferred embodiments of the invention have been shown and described, other embodiments and modifications thereof will be apparent to those skilled in the art, and will fall within the scope of invention as defined in the following claims.

What I claim is:

1. In a motor control circuit having a pulse triggering circuit for providing pulses which are synchronized with respect to an alternating current for controlling said motor, an improved triggering circuit comprising a trigger device, a capacitor, a diode and a variable resistor connected in parallel between said capacitor and a source of said alternating current, said diode being poled to cause said capacitor to become charged by said current during half-cycles thereof of given polarity, a discharge circuit for said capacitor, said variable resistor providing a variable time-constant in said discharge path for causing at least partial discharge of said capacitor during the current half-cycles of opposite polarity to said given polarity, means to actuate said trigger device when said discharge of the capacitor reaches a predetermined value, means to deactivate said trigger device at the end of said current half-cycles of opposite polarity, and a current phase-advancing circuit connected in said discharge path and cooperative with said variable resistor to advance the phase of said current half-cycles of opposite polarity relatively more greatly as said variable resistance is decreased in value.

2. A triggering circuit as claimed in claim 1, in which said current phase-advancing circuit comprises a resistor and a capacitor connected in parallel and interposed in series with said variable resistor.

3. A triggering circuit as claimed in claim 1, in which said current phase-advancing circuit comprises a second diode and a capacitor connected in parallel and interposed in series with said parallel-connected variable resistor and first-named diode, said second diode being poled the same as said first-named diode.

References Cited
UNITED STATES PATENTS 3,222,583   12/1965   Gutzwiller _____ 323—22 XR JOHN S. HEYMAN, *Primary Examiner.*

ARTHUR GAUSS, *Examiner.*

S. D. MILLER, *Assistant Examiner.*